Nov. 24, 1970     P. FRENCH     3,543,066
DISCOIDAL ELECTRIC MOTOR WITH COMPENSATING WINDINGS
Filed Dec. 23, 1968     4 Sheets-Sheet 1

INVENTOR.
PARK FRENCH
BY Hill, Sherman, Meroni, Gross & Simpson ATTORNEYS

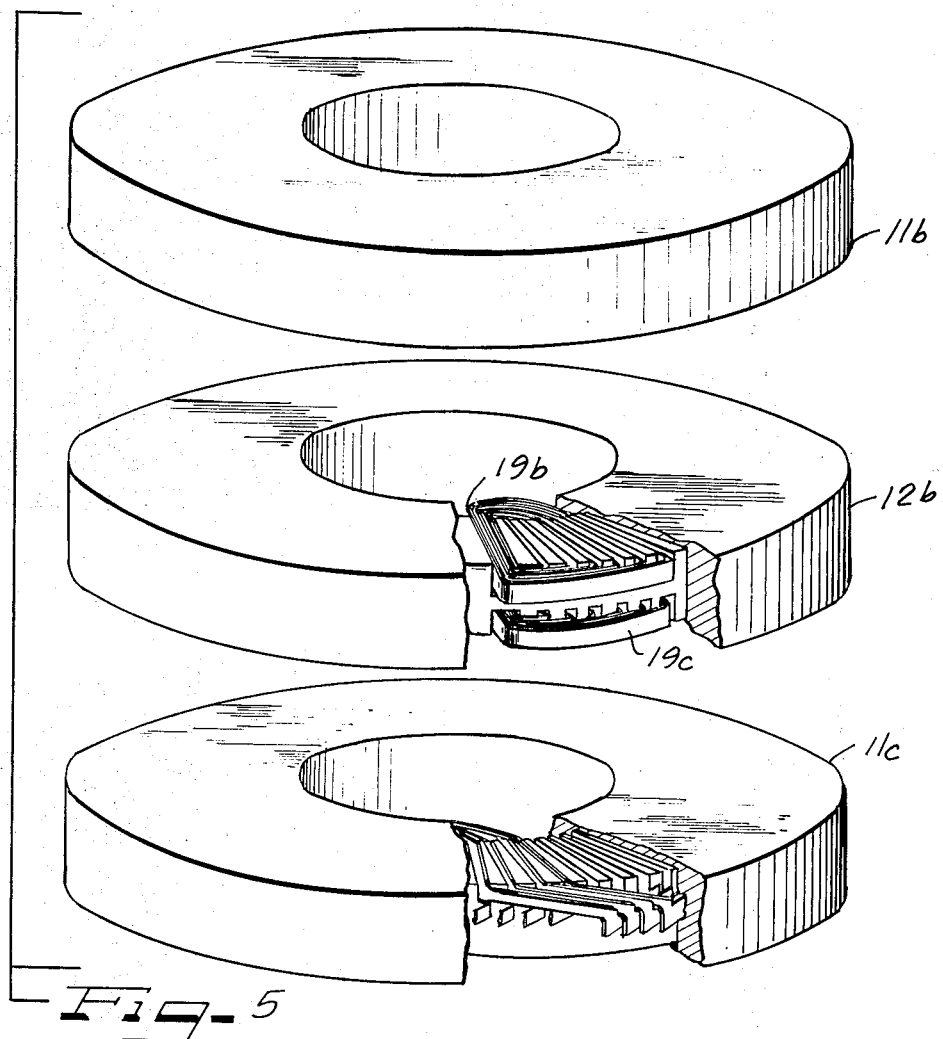
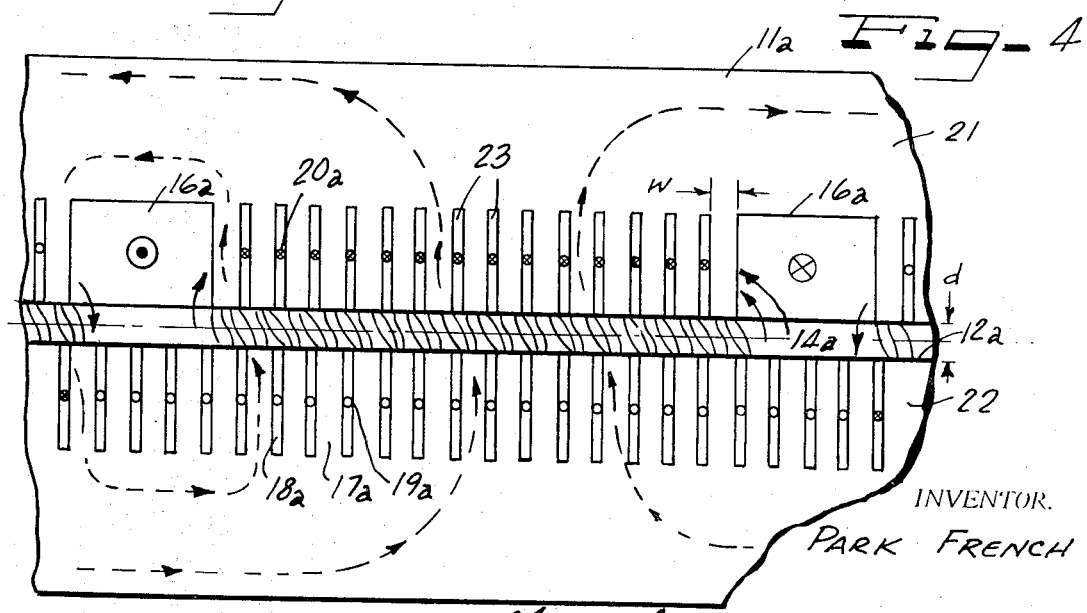

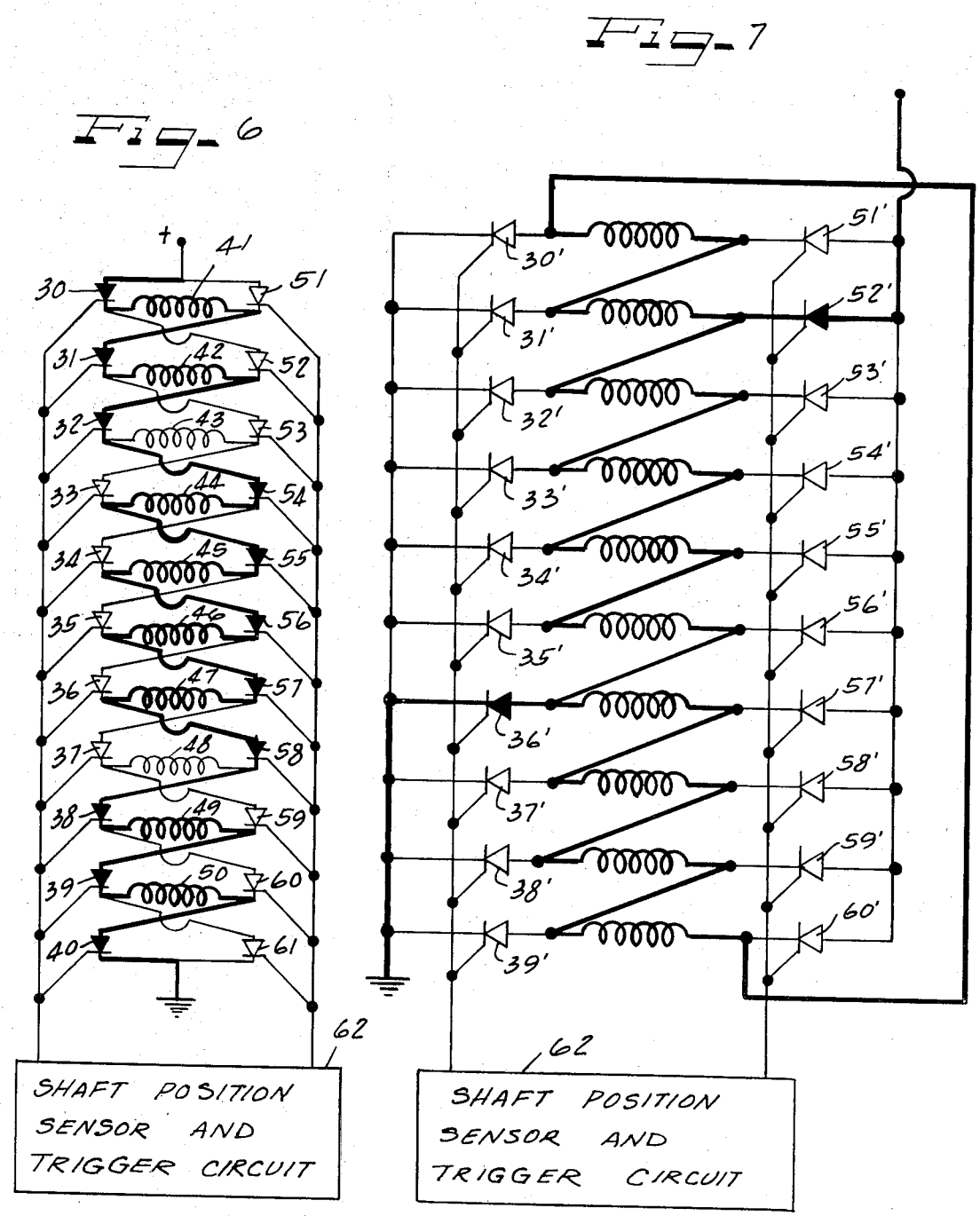

United States Patent Office 3,543,066
Patented Nov. 24, 1970

3,543,066
DISCOIDAL ELECTRIC MOTOR WITH
COMPENSATING WINDINGS
Park French, Aurora, Ohio, assignor to TRW Inc.,
Cleveland, Ohio, a corporation of Ohio
Filed Dec. 23, 1968, Ser. No. 786,330
Int. Cl. H02k 3/16
U.S. Cl. 310—186                                10 Claims

ABSTRACT OF THE DISCLOSURE

This invention is directed to a motor construction which includes a series of disc-type rotor and stator elements mounted in an interleaved manner along a common axis, wherein rotors and stators are alternated so that forces are transmitted between the adjacent faces of each pair of rotors and stators. Each rotor and stator element is comprised of a flat disc-like ring having a plurality of coils mounted in a corresponding plurality of radial slots to provide a unique winding pattern that produces an oblique field for eliminating vibrations of the disc elements.

BACKGROUND OF THE INVENTION

Field of the invention

This invention relates generally to dynamoelectric motors which are characterized by generally oblique fields over the active pole pieces of the motors. Specifically, the present invention is directed to a motor construction which includes a series of disc-like rotor and stator elements mounted in an interleaved manner along a common axis and wherein the pole pieces of the stator include a series of slots for receiving windings therein.

DESCRIPTION OF THE PRIOR ART

Heretofore, designers of dynamoelectric machines such as motors have taken great care to decrease the noise and vibration which occurs in such machines. One approach to decreasing noise and vibration is to precisely balance the rotor of the machine. Another approach is to greatly improve the bearing support structure which journals the armature of the machine. However, such approaches have failed to decrease noise and vibration which is caused by various characteristisc of the magnetic fields within the machine.

SUMMARY OF THE INVENTION

Briefly, the present invention is directed to a family of dynamoelectric motors which are characterized by oblique fields which are formed over the active pole pieces of the motors. Motors constructed in this manner can develop high power per unit weight and high efficiencies at moderately low shaft speeds. Furthermore, the geometry of motors constructed in this manner allows the incorporation of features which permit very qiuet operation.

A novel feature of the present invention, which enables motors to develop high power per unit weight, is a pole and winding configuration which allows an extreme degree of pole compensation as well as liquid cooling in the winding. The high degree of pole compensation allows the development of driving forces per unit pole area which are far greater than in conventional motors. The force per unit area developed in a motor constructed in accordance with this invention can approach the theoretical maximum value associated with the saturation flux density of the magnetic pole material which is used. Liquid cooling of the rotor and stator windings is incorporated to make use of the high driving force per unit pole area capability which is provided by the compensation scheme of the present invention. The pole and winding configuration allows large areas of the winding surface to be exposed to a coolant. Furthermore, the heat transfer paths from the uncooled portions of the windings to the cooled portions are kept very short so that the heat transfer to the regions of the windings which are cooled will be sufficient to prevent overheating.

Another novel feature of the present invention is a pole and winding configuration for motors which allows silent operation of the motor. This is accomplished primarily by local cancellation of forces which are normal to the pole faces and which forces contribute no torque to the motor shaft. The attractive forces of the motor are magnetic, while the canceling and/or repelling forces may be either hydrostatic or hydrodynamic. The local cancellation of normal forces prevents stressing and consequent deflection of the motor structure by these non-contributory forces. Such deflection occurs periodically in conventional motors and contributes to the noise level produced by the mqtor.

Where hydrostatic or hydrodynamic supports are employed there will be various drag losses associated with the rotor-stator interface. These losses will be directly proportional to the interface areas involved. From this, it can be shown that the very high driving forces per unit area available are important from an efficiency standpoint. The power output at the shaft is proportional to the torque developed, which is in turn proportional to the pole area or the rotor-stator interface area. Since the drag loss is proportional to this same area, it can be seen that a large ratio between driving force per unit area and drag loss per unit area contributes to high efficiency. Therefore, it can be seen that the same features which provide high power per unit weight also contribute to high efficiency operation.

Accordingly, an object of the present invention is to set forth a new and novel technique for constructing dynamoelectric machines which enable the machines to have high power per unit weight as well as high efficiency.

Another object of the present invention is to provide a motor construction which allows more quiet operation of the motor.

Another object is to provide a motor which can be flooded for extreme pressure operation.

Other objects, features and advantages will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 4 is an edge view of a disc-shaped armature and field constructions which are incorporated in the motor configuration of the present invention;

FIG. 5 is an expanded perspective view of the rotor and stator construction of the present invention;

FIG. 6 is a schematic diagram showing the switching circuits necessary to commutate high voltage current through the various windings of the motor of this invention;

FIG. 7 is an alternate switching arrangement for commutating low voltage current through various windings of the motor of the present invention.

DESCRIPTION OF THE PREFERRED EMBODIMENTS

Figure 1:
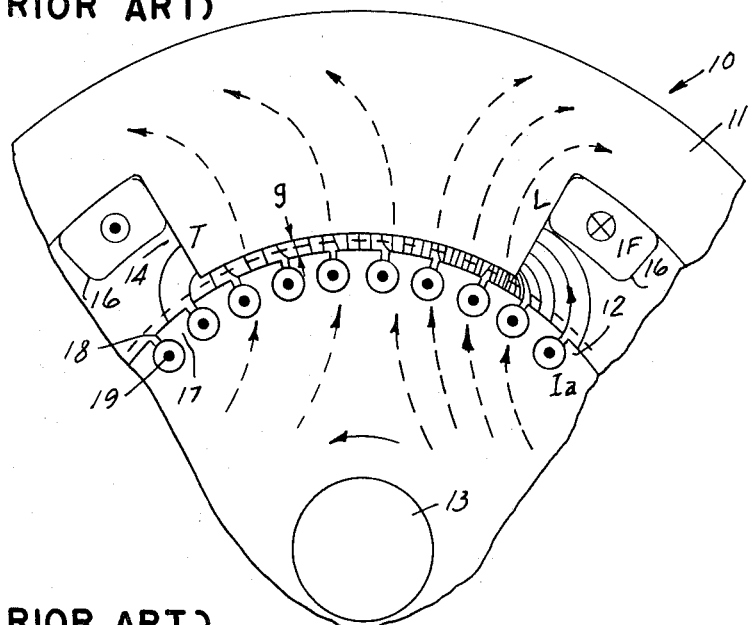
FIG. 1 is a somewhat diagrammatic representation of a portion of a motor constructed according to the teachings of the prior art.

Shown in FIG. 1 is a shunt-field direct current motor of conventional design and designated generally by reference numeral 10. The motor includes a housing 11 which forms the stator of the motor, and a rotor 12 journaled about a shaft 13.

A pole piece 14 is formed as an integral portion of the housing 11 and is wrapped by a field winding 16. It will be understood that a second pole piece opposite the pole piece 14 may be included in the motor, but is not shown for convenience.

The rotor 12 includes a plurality of segments 17 separated by slots 18. Positioned within each of the slots 18 is one or more conductors indicated by reference numeral 19.

For a better understanding of the operation of a motor constructed in accordance with the principles of this invention, the operation of a conventional shunt-field DC motor will be given so that the contrast and unique features of the present invention will be more fully appreciated.

In operation, it will be assumed that current flowing in the right-hand portion of the field winding 16 is flowing into the drawing as indicated by the circled $x$, and that current flowing in the left-hand portion of the field winding 16 is flowing out of the drawing, as indicated by the circled dot. Furthermore, current flowing through each of the conductors 19 is flowing out of the drawing. The current flowing through the armature windings 19 is designated by $I_a$, and the current flowing through the field winding 16 is designated by $I_f$. The direction of rotation of the rotor 12 is taken to be counterclockwise as indicated by the small arrowed line near the shaft 13. To further facilitate the understanding of operation, magnetic flux densities in the space between the rotor 12 and the pole piece 14 are indicated by the solid line densities on the drawing, and the field direction is indicated by the arrow pointing in the line direction. The flux densities and direction in the rotor 12 and pole piece 14 are indicated by the broken lines.

The flux densities shown between the armature 12 and pole piece 14 represent full-load operation of the motor. Under this condition, the gap flux densities vary from a value close to the limit imposed by armature segment or tooth saturation at the pole leading edge L to a small fraction of that value at the pole trailing edge T. The variation of flux density is caused by the superposition of gap fields due to the armature currents upon those due to the field currents. Near the pole center the gap flux density is essentially that due to the field currents. Moving toward the leading edge of the pole, the gap density increases progressively as one passes over each armature tooth, since armature current effects add to the field current effects in the leading half of the pole 14. On the trailing side of the pole, the armature effects subtract from the field effects, so the gap density decreases as one moves in that direction. Full load conditions occur when the ratio of armature current to field current yields approximate field cancellation at the pole trailing edge and the magnitudes of the currents produce incipient iron saturation of either armature or pole in the region of the pole leading edge.

Considering the magnetic flux pattern shown in FIG. 1, the forces acting between the rotor 12 and pole 14 are magnetic in nature, and the value of these forces can be determined once the magnetic flux distribution is known. The magnetic flux distribution shown in FIG. 1 is very closely related to that which occurs in real motors operating within their proper capacity. However, for purposes of simplicity, it is assumed that the motor is constructed of idealized iron which has an extremely high permeability over its usable flux density range, saturating very quickly when some critical density value is exceeded. This assumption allows considerable simplification in analyzing the motor forces, and it is the equivalent of assuming that all forces of appreciable magnitude are exerted between the rotor and stator pole surfaces.

Accordingly, I assume an idealized iron having high permeability which causes little variation between the theoretical flux distribution in the gap region and the actual flux distribution which exists in a motor operated within its rated capacity. The reason for this agreement between the theoretical and actual distributions is readily seen from FIG. 1. Looking at the path of the flux through the iron of the rotor 12 and pole piece 14, it is apparent that the smallest iron cross-section exists in the armature teeth 17 which are narrow to provide space for the armature conductors 19. The ratio between the minimum tooth cross-section and the tooth face area bounding the rotor-stator gap is commonly one-half or less. Thus, the flux density at the minimum tooth cross-section is usually at least a factor of two larger than the average density at the tooth face. Because of this ratio, the teeth can be operated well into saturation at their cross-section minima without reaching abnormally high surface flux densities at the tooth or pole face, a condition which is common in motors of this type. Consequently, the tooth and pole face permeabilities remain very high, in good agreement with the idealized iron behavior which has been assumed.

The high iron permeability at the pole and tooth faces allows an extremely simple analysis of motor forces. The flux lines leave and enter the pole and tooth faces in the normal directions, and these surfaces are for all practical purposes magnetic equipotentials. An attractive force per unit area is associated with the flux density and acts in the direction of the flux. The magnitude of this attractive or tensile force per unit area is given by the formula:

$$p = \frac{B^2}{8\pi} \tag{1}$$

where $p$ is in dynes/cm.$^2$ and B is in gauss.

The forces between the pole and armature can be determined in a very straightforward manner from the flux distribution by integrating the above force per unit area over the various surfaces of either the pole or armature and taking proper account of the force directions. In FIG. 1, the calculations are particularly simple to perform on the pole, since the pole geometry has been constructed to give purely radial forces on the face and purely azimuthal forces on the edges.

This separation of radial and azimuthal forces allows the calculation of the torque exerted on the pole by the armature by consideration of the pole edges alone, since the radial forces on the face do not contribute to the torque. The torque can be calculated by integrating the product of the force per unit area times the radial distance from the axis of rotation over both the leading and trailing pole edges. The difference between these two integrals yields the magnitude of the torque.

Since the torque exerted by the armature on the pole must be equal in magnitude to that exerted by the pole on the armature, it is clear that carrying out the above integration on the armature would yield the same result. In this case, however, the azimuthal forces act on the slot edges between the teeth, requiring extremely detailed knowledge of the flux distribution to obtain reasonably accurate results.

The simplicity of the above analysis allows considerable insight into the torque producing mechanisms that act in conventional motors. It can be seen very clearly for example, that the torque-producing forces act on the pole and teeth edges rather than on the faces. Further, it is seen that the calculation of these forces is quite straightforward once the flux distribution is known in the pole-armature region. In order to fully appreciate both the capabilities and limitations of the motors, however, it is necessary to develop a better understanding of the influence of the various geometric parameters at the motor designers disposal. To obtain a clearer view of such effects, the influence of gap length and pole face width will now be investigated. Before proceeding, however, it is first necessary to introduce an additional magnetic force concept. Analyses based on the tensile forces alone are sufficiently lengthy that they often obscure the elementary way in which these parameters affect motor performance.

The concept now introduced is that of lateral magnetic pressure. This force per unit area has the same magnitude as the tensile force per unit area described in conjunction with Equation 1. However this lateral pressure is exerted perpendicularly to the field direction and is compressive in nature, in contrast to the tensile nature and the direction parallel to the field in the case of the quantity described earlier. Together, these two forces per unit area comprise the familiar Maxwell stress tensor. Since the field always enters the poles and teeth normal to their surfaces in our analysis, the lateral magnetic pressures always exist parallel to the surfaces, and thus cannot act on them directly. In regions of zero current density, the lateral pressures are exerted only on adjacent regions of the field, and can be interpreted as being responsible for the familiar spreading behavior of magnetic fields.

The lateral pressures are capable of transmitting forces exerted perpendicularly to the field direction, and it is in this sense that they are valuable. Looking at FIG. 1, let us for the moment neglect the effects of armature currents and slots outside the angular sector subtended by the pole. Under these assumptions, let us look at the torque exerted on the leading edge of the pole. The azimuthal tensile force per unit area can be multiplied by the radius and integrated over the leading edge as described earlier yielding an accurate torque value, but requiring knowledge of the flux distribution along the pole edge. Now consider the reaction torque that must be associated with the leading edge torque. Under our simplifying assumptions of the moment, the field meets the armature in the radial direction to the right of the pole leading edge. Thus the associated armature forces are purely radial and provide no torques. This leaves the entire reaction torque to be supplied by the lateral magnetic pressure exerted by the radial gap field at the leading edge. It is through the action of this lateral pressure that the reaction torque is transmitted to the armature teeth and to the trailing edge face. The sum of these two latter torques is, of course, equal to the leading edge torque in magnitude and opposite to it in sign.

In contrast to the extensive field distribution knowledge required for the tensile force calculation of the leading edge torque, the lateral gap pressure calculation requires only a single flux density value. By taking the flux density in the gap at a small distance inside the leading edge, so that a realtively uniform field exists across the gap, one can compute the lateral pressure from Equation 1. Multiplying this pressure by the product of the gap length $g$ and the armature and pole length which is designated by L, one obtains a resultant lateral magnetic gap force F. Multiplying this force by the mean gap radius R yields the leading edge torque to a good degree of accuracy. The error introduced by the neglect of currents and slots outside the sector subtended by the pole is negligible in most motors.

From the lateral gap pressure analysis above, the effect of gap length on torque is immediately evident. Assuming that one can provide the appropriate excitation to keep the gap flux densities constant as $g$ is varied, it is apparent that the lateral gap force increases linearly with the gap length. For gaps small compared to the armature radius, this predicts an essentially linear variation of torque with gap length, which agrees with good design practice.

One further insight gained from the lateral gap pressure concept is the manner in which torque is coupled to the armature teeth. As can be seen in FIG. 1, each tooth has the current $I_a$ flowing between itself and its neighbor on either side. These currents cause the magnetostatic potential of each tooth to increase stepwise as one progresses to the right. Because the slot currents are all of the same value, $I_a$, the potential increase as one passes from one tooth to the next will be close to the same value, so long as no saturation occurs anywhere in the tooth. Thus, beginning at the pole trailing edge and progressing to the right, the tooth potential, and thus the associated gap flux densities, increase in a uniform stepwise manner for about three quarters of the distance to the leading edge. At about this point, iron saturation in the lower portions of the teeth begins to cause noticeable magnetomotive force drops within the teeth, resulting in smaller potential differences between adjacent teeth than exists close to the trailing edge. Consequently, the flux density increases by progressively smaller amounts as one passes over the last several teeth near the leading edge side of the pole.

Just as was done in the case of the pole forces, the individual tooth forces can be calculated from the lateral gap pressures. By multiplying the lateral pressure above the teeth by the product of the gap length $g$ and the armature length L, the lateral forces transmitted by the field above each tooth can be calculated. Force differences between adjacent teeth must equal the azimuthal tensile forces applied to the teeth edges, these latter forces producing armature torque directly. Since the lateral gap pressures vary as $B^2$, and since the B increases by small increments, we can calculate the change in pressure, $\Delta p$ and thus lateral force, $\Delta F$, between teeth from the differential approximation below with reasonable accuracy.

$$p_\Delta = \frac{\Delta B^2}{8\pi} \quad (2)$$

$$\Delta B^2 \cong 2B\Delta B \quad (3)$$

$$\Delta p \cong \frac{B\Delta B}{4\pi} \quad (4)$$

where $\Delta B$ and $\Delta B^2$ are the changes of B and $B^2$ in the gap above adjacent teeth.

In terms of the lateral pressure, the lateral force is $$F = pgL \quad (5)$$

so the force acting per tooth is $$\Delta F = \Delta p j L \quad (6)$$

$$\Delta F \cong \frac{gL}{4\pi} B\Delta B \quad (7)$$

Since $\Delta B$ is relatively fixed over the region from the pole trailing edge to approximately three quarters of the way to the leading edge, B will increase linearly with distance from the trailing edge in this region, as will also the product $B\Delta B$ and the force per tooth $\Delta F$. Between this region and the leading edge, B continues to increase, albeit more slowly, whereas $\Delta B$ progressively decreases, with the result that the rate of increase of tooth force progressively falls off as one approaches the leading edge. Beyond the leading edge, of course, the tooth force rapidly decreases to an almost negligible value.

From the above analysis it is evident that the lateral forces and torques exerted between the pole and armature depend on the gap area (gap length, $g$ times armature and pole length, L) and the gap flux densities at the leading and trailing pole edges. These densities depend on the magnetostatic potential differences between pole and armature at the pole edges (assuming appropriate field excitation) which in turn depend on the total armature current flowing within the sector subtended by the pole. It is clear that the sector angle, or pole width, has no direct effect on the torques or lateral forces. These parameters do influence the forces and torques in a secondary manner, however, inasmuch as they determine the total armature conductor cross-section available per pole for carrying the armature current, and therefore influence the armature resistive power loss per pole. As a consequence, efficiency or heat transfer requirements generally determine minimal pole widths for given lateral force or torque values.

In the foregoing discussion there has been developed a good insight into the effects and influences of the various geometric features of conventional electric motors. Now, let us extend these concepts into the realm of high power density machines. As a first step, we shall investigate the difficulties encountered in attempting to operate the conventional shunt motor of FIG. 1 above its design torque.

We shall first look at the case of enhanced armature current, a condition normally occurring during startup or overload of a conventional motor. As was brought out in the earlier discussion, only the small cross-section portions of the armature teeth run near magnetic saturation under design torque conditions, whereas the pole and armature tooth faces operate at substantially lower flux density values. Since the gap flux densities (at the faces) are the quantities directly involved in torque production, it would appear that substantially higher torque values are potentially available, if a satisfactory means can be found to operate the tooth and pole faces closer to saturation flux densities.

Simply overloading the motor does increase these densities and also the torque somewhat. For small percentage increases above the design value, virtually the only penalty paid is a slightly lowered efficiency. This efficiency loss arises principally from two sources. The first is intrinsic in the motor design, even when operated below its design torque value. The natural behavior of the motor is to increase its torque and thus its power (at a given r.p.m.) linearly with armature current when operating at a given r.p.m. The armature resistive losses, however, increase as the square of the current, consuming a larger fraction of the input power as the torque level increases. The second source of enhanced loss is the increase in armature tooth saturation resulting from higher flux values per tooth. Under even slight overload conditions, substantial increases commonly occur in the MMF drops across the small cross-section regions of the teeth. These increased MMF drops result in a typical motor behavior in which the rate of rise of torque with armature current becomes progressively less as the torque levels are extended above the design value. The result, as in the first case, is an enhanced resistive power loss in the armature conductors.

Figure 2:
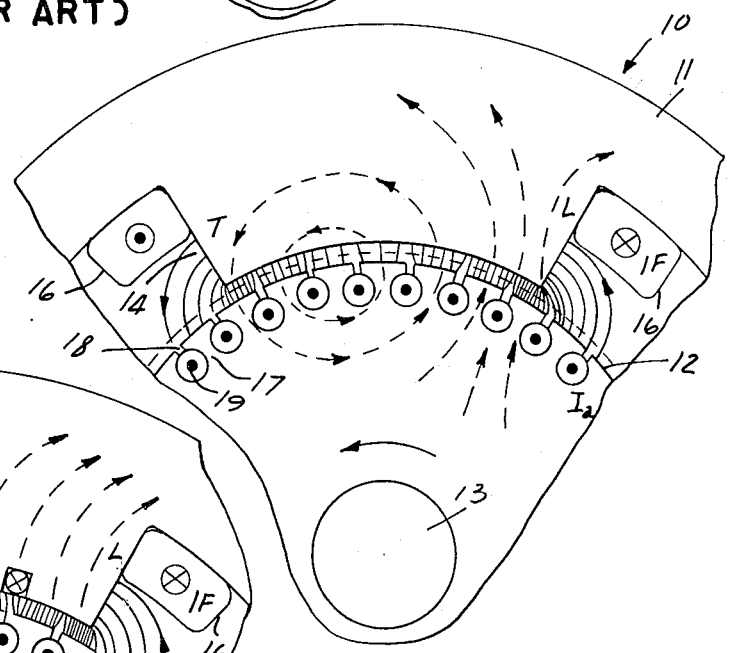
FIG. 2 is a somewhat diagrammatic representation of the motor of FIG. 1 showing the magnetic flux paths during an overload condition.

Upon pushing the torque levels far beyond the design value, however, the situation changes in a more fundamental sense. Because of the greatly increased armature currents, the azimuthal distance along the armature face required for the change in gap flux density from zero to the maximum value (limited by severe tooth saturation) is now much smaller than the pole width. If the field excitation current is not increased, the flux direction on the trailing side of the gap will actually reverse, as shown in FIG. 2. This reversed flux at the trailing edge can become appreciable in density at very high armature currents and can be seen to cause trailing edge forces which actually detract from the output torque. Increasing the field excitation to the appropriate value can reduce the trailing edge flux density to essentially zero, removing this detracting torque. Nevertheless, the situation is still far from optimum. A large fraction of the teeth are operating saturated, resulting in a greatly increased pole flux and requiring a large return path cross-section. The torque, however, is essentially no greater than that obtained when only the tooth under the pole leading edge is strongly saturated. Moreover, the armature and field conductor losses for the situation depicted in FIG. 2 have increased substantially over the case where only the tooth at the leading edge is saturated.

Several solutions exist for the above problem. The most direct solution, and one practically applicable to single speed, fixed load motors is that of simply increasing the gap length until the azimuthal distance required to go from zero gap flux density to the maximum desired value matches the pole width at the enhanced current levels which are to be employed. This solution renders low torque operation inefficient, however, since excitation powers remain very high because of the large gap length.

The second solution to the problem would be to leave the gap unchanged, but to decrease the pole width to match the azimuthal distance required for the gap flux density to go from zero to its maximum desired value under the enhanced armature current conditions. This would minimize the total resistive power loss associated with each pole without appreciably decreasing the torque per pole. The decrease in pole width would allow more poles for a machine of given size, providing increased power and torque. This machine would not suffer from an efficiency standpoint under fractional load operation in most cases, but would require considerable sophistication of its commutating circuitry because of the larger number of poles. A further penalty, although one not nearly as serious as in the large gap case, is the requirement of increased field excitation power. The field excitation power in the large gap case increased roughly as the square of the torque output, whereas in the present case the excitation power increases with output torque at a rate less than linearly.

Figure 3:
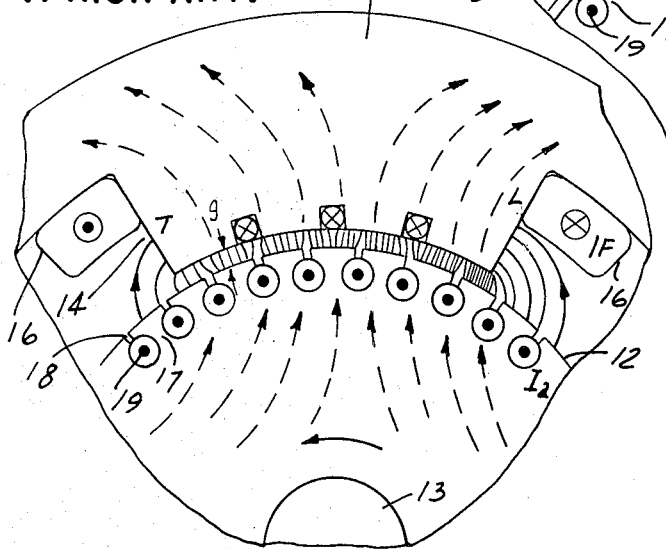
FIG. 3 is a diagrammatic representation of another motor constructed according to the teachings of the prior art.

A third solution to the problem incorporates a method shown in FIG. 3, that of employing pole-face compensating windings, which combines the load flexibility and enhanced torque of the previous method with the commutation simplicity of the original motor. In this method, conductors carrying armature current are placed in slots in the pole-face, with currents passing in such a direction as to counteract in part the gap flux density variation across the pole resulting from the armature current. When this compensation technique is completely carried out, it results in a flux distribution like that shown in FIG. 3, in this case giving the same torque improvement as could be obtained by increasing the number of poles by a factor of four. The pole-face windings increase the motor losses, of course, the added loss typically being about equal to the armature loss. The field excitation losses, however, remain equal to those of the original motor, usually becoming negligible compared to the greatly power output of the modified motor. Thus this last technique provides greatly enhanced motor torque and power without overly severe restrictions on load flexibility and without introducing undue complication of the commutation system. Although the prior art motor of FIG. 3 provides improved operation it still falls short of the maximum theoretical capabilities.

Seen in FIG. 4 is a rotor and stator arrangement using the novel concepts of the present invention and shows a pair of disc-shaped elements 21 and 22. The disc-shaped element 21 corresponds to the stator of FIG. 1 and is designated by reference numeral 11a. The disc-shaped element 22 corresponds to the rotor of FIG. 1 and is designated by reference numeral 12a. The stator 11a includes a pole piece 14a which has a plurality of slots 23 for receiving conductors 20a of a compensating winding. The pole piece 14a is wrapped by a field winding 16a with the portion of the winding on the left side of the pole piece having current coming out of the drawing and the portion of the winding on the right side of the pole piece having current flowing into the drawing, as indicated. The rotor 12a moves in the direction indicated by the arrow head line 24.

The first feature of note in FIG. 4 is the uniform distribution of the armature and compensating windings, which have essentially the same periodicity and cross-section. Slight differences are desirable from a noise standpoint, as will be discussed later. The distributed nature of the armature and compensating windings as shown in FIG. 4 gives rise to several distinct advantages over even highly developed conventional motors, such as the type shown in FIG. 3. The new concept offers much higher lateral force per unit area at the pole-armature interface, for example. The reason for this improvement can be easily understood by recalling the earlier statement that the pole (or pole subsection) width had no direct effect on the torque produced per pole (or pole subsection). In the associated discussion it was pointed out that only the leading and trailing edge gap flux densities, together with the gap area ($g$ times L) were important in determining the torque per pole in a machine of given armature radius. It was further pointed out that the minimal pole width was usually determined by the necessity of encompassing a minimal armature conductor cross-section as required from efficiency or heat transfer standpoints.

Looking at FIG. 4, it can be seen that any desired conductor cross-section can be obtained by varying the slot depth for the armature or compensating conductors, thus removing the above restriction. With the removal of this restriction, we are now at liberty to narrow the pole subsections (henceforth called pole teeth) until a performance maximum is reached. Performance improves until mutual interference effects between leading and trailing edge flux densities begin to detract appreciably from the torque per pole tooth. While narrowing the pole teeth, we also find it is advantageous to narrow the armature teeth to approximately the same width, which truns out to be of the same order of size as the gap length, $g$, for optimum lateral force per unit interface area.

In FIG. 4, the gap length is indicated by, $d$, and the width of the teeth is indicated by W. Therefore, W is approximately equal to $d$. After carrying out the optimization of the teeth widths, we are now in a position to to minimize the conductor loss per unit lateral force through an optimization of the ratio between tooth widths and the widths of the conducor slots. This optimization yields slot widths which are approximately half the widths of the adjacent teeth. That is, the slot width is one half W.

A second, and very important result follows from this optimization study. When constructed according to the above geometric optimization, the new motor is capable of practically attaining two thirds of the maximum theoretical lateral force per unit interface area which can be developed between a pole and armature of given magnetic material by any means whatsoever. This second result is of extreme importance where flooded motor operation is necessary, for it assures far smaller interface areas and hydrodynamic drags for motors of specified power output than are available with conventional designs.

Another distinct advantage offered by the new design becomes evident when we investigate the field excitation power requirements. In this case, we will look at the effect of scaling the tooth and gap geometry simultaneously. That is, we will vary the gap length while keeping the ratios of gap length to tooth and slot widths constant. This type of variation causes the magnetic configuration to scale exactly, providing we maintain equal flux densities at any two corresponding points in the original and scaled geometries. We will assume this last condition is maintained.

Because of the exact scaling of the flux distribution, it follows that the magnetic pressure distribution also scales exactly. As a consequence, we can conclude directly that the force per tooth varies directly with the gap length. Since the tooth and slot widths also vary direcly with the gap length, however, the number of teeth in a pole of fixed width varies inversely with the gap length. The torque per pole, which is proportional to the lateral force per tooth times the number of teeth per pole, thus becomes the product of a quantity which varies directly with the gap length and one which varies inversely with gap length. The result is that the torque per pole is independent of the scaling which we have performed, provided, of course, that the flux densities have been maintained at their original levels.

From the above, it has been concluded that the torque output from a motor is the same whether a few large teeth per pole are employed or whether many small teeth of a suitably scaled configuration are used. Let us now examine the field excitation requirements under the influence of this scaling. Because of the unaltered flux densities, it follows that the magnetomotive force drop across the gap varies linearly with the gap length. If we assume that the bulk of the magnetomotive force drop in the field flux path occurs in the gap, a condition which is true for all good designs, then the total ampere turns requirement for the field exciting circuit varies approximately linearly with the gap length. Since the excitation power is an $I^2R$ loss, it varies approximately as the square of the gap length.

The excitation power discussion above strongly favors small gap lengths and narrow teeth, which in turn provides a strong recommendation for the distributed conductor construction shown in FIG. 4. The multiplicity of teeth, however, provides another extremely important advantage in the uses intended for the motor described here. When done in conjunction with proper skewing of the conductor slots and perhaps also with slight differences in pole and armature tooth periodicity, increasing the number of teeth can reduce the torque ripple and thus the vibration and noise levels to almost any desired degree.

While on the subject of torque ripple and vibration, it should be pointed out that the previous optimization in which the teeth widths were reduced to the approximate size of the gap length also contributes to the inherent quietness and lack of vibration of the new motor. This effect arises from the mutual interference between trailing and leading edge tooth fluxes, which tends to uniformize the gap flux in both magnitude and direction. As a consequence, no sharp changes in tooth forces occur as armature teeth alternately pass pole teeth and conductor regions.

The above phenomenon can be profitably viewed from another standpoint. The existence of the mutual interference between the trailing and leading edge fluxes and their resultant uniformizing tendency can be interpreted as characteristic of a physical system in the transition region between discrete component interactions and continuum mechanics. A continuum mechanics motor would, of course, perfectly fit all possible vibration and torque smoothness requirements, for it would have no spatially periodic elements to cause time variations in forces and torques. It is not possible to construct a continuum mechanics motor at present, however, for materials would be required having both very specialized tensor conductivity and permeability properties. In addition, continuum commutation elements would be required whose nature is difficult to even predict today.

Nevertheless, a theoretical continuum mechanics machine is useful as an idealized concept. The predictions of its behavior as related to this case are quite straightforward, and it can be assumed that any alteration which brings the behavior of the new motor closer to this idealized behavior constitutes an advance. Viewed in this light, it can be stated that increasing the number of teeth per pole results in a gap flux distribution closer to the continuum motor distribution. Therefore, less torque ripple and vibration should be expected.

One further contribution obtained from the continuum motor concept is an altered and simplified way of performing torque computations. The gap flux distribution of a continuum motor of the general design of the motor shown in FIG. 4 would be somewhat similar to that shown. The principal differences would be that the flux would leave the pole surface at a fixed angle and with uniform density except near the pole edges, and that the fixed angle would be maintained across the gap to the armature surface. The field, in essence, could be described as uniform in density and of a fixed oblique direction over the pole surface.

The calculation of the torques produced by the oblique field does not lend itself to the simplified techniques developed previously, since the surfaces involved do not simulate magnetostatic equipotentials. To calculate these quantities, it is necessary to resort to the basic definitions of the torque, computing the azimuthal component of the tensile and compressive forces per unit area and integrating the product of this component and the radius over some appropriate surface. It should be noted that the surface of integration need not be the pole or armature surface. Any imaginary surface could be constructed within the gap and the tensile forces on one side would be precisely canceled by those on the other and would also equal those on the pole and armature. Thus, a surface like that shown by the center-plane line in FIG. 4 would be suitable for performing the torque integration. As a matter of fact, it would be the simplest of all surfaces for the motor concept of the present invention, since the field is essentially uniform in density and angle over the entire pole region in this plane.

The important and novel results obtained by constructing a motor using the teachings of this invention cannot be overemphasized, for forces of the type under discussion, e.g., forces between rotors and stators which act normal to the faces and produce no torque, can be very serious offenders from the noise and vibration standpoints. The rotor-stator normal forces are usually the largest forces acting between components in a motor. Further, in conventional motors they act in a direction which permits them to interact with structural inhomogeneities to form gap length variations, which in turn produce density variations in the gap flux. These spatial flux density variations become temporally periodic force variations through interaction with the moving rotor. At this point, it is not difficult to see that these time varying forces can cause not only periodic structural accelerations, but can couple to the azimuthal forces causing periodic torque fluctuations as well.

Considerations like those above cause one to regard the local cancellation of the normally directed rotor-stator forces as extremely desirable in a low noise motor. One method of providing the canceling forces is through the use of hydrostatic or hydrodynamic surface support techniques such as are used in fluid bearings. This approach also fits nicely with the desirability of flooding the motors for extreme pressure operation.

After sufficient investigation, it was found that very shallow relief patterns in a covering over the pole faces would provide appropriate cancellation of the rotor-stator normal forces, at low hydrodynamic power losses. In this method, the pressure pattern is stationary with respect to the poles and controllable in its distribution. The armature surface is smooth, and liquids of approximately the viscosity and density of water yield best efficiencies and dimensional control. The only restriction imposed by this technique is the requirement that the rotor and stator be free to alter their spacing over several thousandths of an inch to establish the proper hydrodynamic pressure.

When using the hydrostatic method, a chamber is formed between the rotor and stator with the rotor and stator surfaces forming opposite walls of the chamber. A pump is used to supply the desired pressure into the chambers thereby providing a force which will maintain the facing surfaces of the rotor and stator separated.

When using the hydrodynamic method, fluid is placed between the rotor and stator surfaces. One of the surfaces, for example, the rotor, is provided with a forward slider which has an up-turned leading edge and a rear slider. As the rotor moves through the fluid, the fluid is forced under the forward slider and trapped between the two sliders to provide a pressure between the rotor and stator surfaces.

The restriction regarding rotor-stator spacing, small as it appears, nevertheless poses great problems if one attempts to adapt the usual concentric cylinder motor geometry to the silent motor concept. While methods were ultimately developed for this adaptation, they were complex, cumbersome, and appeared expensive in manufacture. In contrast to the difficulties described with the concentric cylinder geometry, disc element geometry as described in conjunction with FIG. 4 appears ideally suited to the silent motor concept.

FIG. 5 shows one method of arranging or stacking alternate rotor and stator elements which are constructed in accordance with the principles of this invention. The rotor $12b$ is shown as having armature windings $19b$ and $19c$ disposed on opposite sides of the rotor so as to be adjacent to stator windings on the stators $11b$ and $11c$, respectively. The discs $11b$, $11c$ and $12b$ are stacked together along a common axis with rotors and stators, or counter-rotors, alternating if more than two elements are used. Forces are transmitted between the adjacent faces, as described above in conjunction with FIG. 4. In this geometry, simple axially compliant mounting of discs provide the necessary axial freedom of motion required by the hydrodynamic techniques of canceling the normal magnetic forces.

The second approach to noise control has already been mentioned in the discussion regarding tooth size. In this second approach every effort has been made to eliminate or reduce the magnitude of azimuthal variations in the armature structure and the field-armature interactions over the poles. The reduction of azimuthal variations in armature structure is relatively straightforward except for the matter of teeth, which will be dealt with presently. It is mostly a matter of assuring concentricity and structural uniformity in the fabrication of the armature, so that no time-varying deflections are set up by azimuthal variations encountering the spatial force variations in the pole-edge regions.

The tooth force variation can be decreased by smoothing out the gap field distribution (tooth spacing comparable to gap length) and by employing many small teeth. The latter measure reduces the force per tooth and is especially important in minimizing the torque fluctuation as a tooth passes over a pole edge. As mentioned previously, problems of interactions related to the pole and armature tooth periodicity can be largely controlled by skewing the conductor slots and by using slightly different periodicities on poles and armature.

The extent to which the above technique can be carried out depends largely on the fabrication limitations encountered in construction the large numbers of narrow poles. Currently, poles as narrow as .030″ can be made in properly oriented laminated electrical steel discs. This width is already smaller than necessary for the described silent motors.

One other structural problem intrinsic in the pole and armature design under discussion is that of obtaining adequate stiffness of the long, narrow teeth. This can be accomplished by the impregnation of the wound pole and stator elements with certain epoxy resin materials to yield adequate stiffness and strength.

The third method used to reduce noise and accelerations has been that of suppressing or eliminating vibration or noise sources which are mechanically excited by the rotating components of the motor. This approach involves the use of plain bearings, the employment of excellent balancing techniques, the elimination of protuberances on rotating components, etc.

In addition to the noise and vibration produced by the geometric and structural features of the motor, there is also noise and vibration production by current variations resulting from imperfect commutation of the armature coils.

Seen in FIG. 6 is a commutating circuit which performs much the same functions as the brush commutating circuits in conventional D.C. motors, i.e., they reverse the coil currents every half cycle. There are some refinements in the circuit that are not possible with brushes, however, such as switching very close to the moment of zero back-E.M.F. for all load conditions, which results from the rectifying action of silicon controlled rectifiers.

The circuit arrangement shown in FIG. 6 includes a plurality of silicon controlled rectifiers 30, 31, 32, 33, 34, 35, 36, 37, 38, 39 and 40 shown schematically as positioned on one side of corresponding armature windings 41, 42, 43, 44, 45, 46, 47, 48, 49 and 50. Similarly, a plurality of silicon controlled rectifiers 51, 52, 53, 54, 55, 56, 57, 58, 59, 60 and 61 are shown connected to the other side of the armature windings 41–50. The gate electrode of each of the silicon controlled rectifiers 30–40 and 51–61 is connected to a shaft position sensor and triggering circuit 62. The triggering circuit 62 renders selective ones of the silicon controlled rectifiers conductive so as to cause current flow to pass through selected ones of the armature windings. The circuit arrangement shown in FIG. 6 is preferably used for supply voltages in excess of 100 volts.

Again referring to FIG. 4, the pole regions are separated by large slots containing the field excitation coils. These slots contain no magnetic materials, resulting in low magnetic fields, and are quite large in width, typically being on the order of 30% of the pole width. The behavior of coils entering the regions subtended by these slots is to exhibit an initially raipd drop in back-E.M.F. followed by a more gradual decrease until zero voltage is reached at the center of the slot. It is in this region of low back-E.M.F. that current turn-off is accomplished.

The detailed actions involved in the commutation can be best explained with reference to FIG. 6, in which the path of the current through the coils is indicated by the darkened silicon controlled rectifier and heavy lines. It will be noted in the figure that zero-current coils separate the groups of coils having opposite current directions. These zero-current coils are in the low back-E.M.F. regions associated with the field winding slots.

As a coil enters the region of a field winding slot, the coil progressing ahead of it is a zero-current coil, which has a lower back-E.M.F. than the entering coil until both E.M.F. values become very small. At a point which is predetermined to allow the necessary turn-off period for the silicon controlled rectifier supplying current to the entering coil, the silicon controlled rectifier opposite it in the figure is triggered. This action places both the entering coil and the zero-current coil momentarily in parallel. The difference in back-E.M.F. values of the coils then terminates the current in the entering coil, transferring it to the formerly zero-current coil. It will be noted that the current flow has changed directions during the transfer, as required by the reversed magnetic field encountered as the coils move out of the low field region.

The commutating circuit possesses several excellent features. First, with regard to suppressing current and torque ripple, it should be noted that the back-E.M.F. and torque loss resulting from a coil leaving a pole region can be almost exactly balanced by the coil entering the pole region from the other side. The residual back-E.M.F. difference does constitute a driving voltage which tends to cause current ripple, but this voltage must act through the total armature inductance, which is large enough to give good ripple suppression. It should be noted that if the above measures prove insufficient, armature current regulation can be supplied at very small weight and efficiency penalties. The fact that switching takes place when the coils are in low-field regions is also of extreme importance, for it minimizes the torque ripple generated by timing errors.

Another good feature of the circuit is that it minimizes silicon controlled rectifier turn-on power, intrinsically adding to the electrical efficiency of the motor. Since the forward voltage is quite low at turn-on, no appreciable power is dissipated during the interval required to build up the charge carrier concentration to its equilibrium value. This problem is usually quite severe in A.C. inverter circuits, and in itself stands as an advantage over A.C. motors in general.

The circuit shown in FIG. 6, for controlling the motor is intrinsically a high-voltage circuit. For proper operation of the silicon controlled rectifier self-turn-off feature, it is necessary to group adjacent armature conductors into coils somewhat narrower than half the field winding slot width. This requirement necessitates at least ten coils in the region subtended by a pole and the adjacent field winding slot. Coils in all pole regions can be interconnected, so that the existence of many poles does not increase the number of coils from the commutation standpoint. FIG. 6 shows that eleven silicon controlled rectifiers are always in conduction in a ten coil array. Since the minimal forward drop across the silicon controlled rectifiers is approximately 0.8 volt, a fixed drop of about 9 volts is inherent in the circuit.

For voltage supplies of several hundred volts or more, the efficiency penalty incurred is not severe. If it is desired to operate with supply voltages in the 100 volts or below range, however, it is advisable to use a somewhat simpler circuit in which only two silicon controlled rectifiers conduct simultaneously as shown in FIG. 7. The silicon controlled rectifiers shown in FIG. 7 are controlled by the shaft position and trigger circuit 62 in much the same manner as the silicon controlled rectifiers of FIG. 6.

One of the chronic problems of motors of virtually all types is that of minimizing the $I^2R$ losses in both the active conductors and the wiring which connects the active conductors together. Extremely sophisticated coil patterns and winding schemes are often developed for this purpose. In the motor described herein, the above considerations have led not only to the development of appropriate winding techniques, but also to geometric optimizations of the pole regions. Studies performed in these areas have shown that the poles should have roughly the same azimuthal width as their radial depth. Several winding patterns have been developed, each for some special purpose such as separate or series field excitation, but all having comparable copper losses.

In connection with copper losses, it should be noted that the active armature conductor sections in the new motor are in a region of substantial A.C. magnetic field. In order to prevent appreciable eddy current losses from this field, it is necessary to wind the armature with insulated wire of small diameter. A technique for easing this problem which appears satisfactory is the fabrication of slot-filling ribbons formed by pressing together and bonding many fine insulated wires. Connection of all the wires in such ribbons is necessary only at the ribbon ends. Their behavior in the motor is precisely the same as solid conductors aside from the reduction of eddy current losses.

Figure 8:
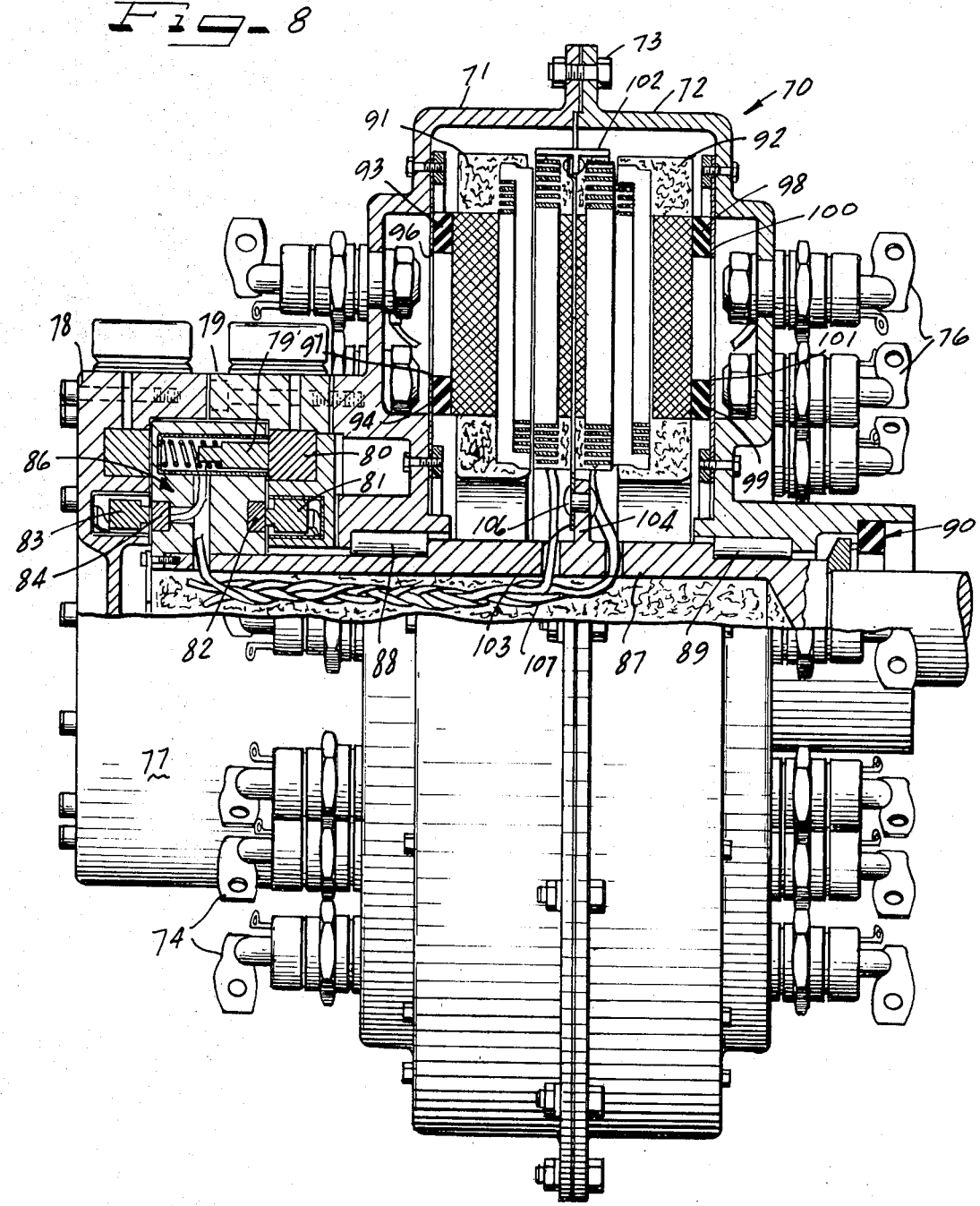
FIG. 8 shows one form of constructing a dynamoelectric motor which incorporates the technological principles of the present invention.

FIG. 8 illustrates one form of motor construction which uses the unique and novel concepts of the present invention. The motor is designated by reference numeral 70 and includes a pair of housing members 71 and 72 which are secured together by a plurality of fasteners 73. A plurality of silicon controlled rectifiers 74 is secured to the motor member 71, and a plurality of silicon controlled rectifiers 76 is secured to the housing member 72.

A commutation housing 77 is secured to the housing member 71 and provides means for supporting brushes and commutating rings or segments necessary for the operation of the motor. The commutation housing 77 is formed of two sections 78 and 79 which are fastened together by a plurality of screws and fastened to the housing member 71. The brushes and commutating rings or segments within the housing 77 are connected to respective stators and rotor of the motor. A brush 79' engages a slip ring or segment 80, and a brush 81 engages a slip ring or segment 82. Similarly, a brush 83 engages a segment 84. The brush 79' and segments 82 and 84 are mounted within a radially extending portion 86 positioned at the end of a partially hollow shaft 87 for rotation therewith. The shaft 87 is journaled by a pair of bearings 88 and 89 and the end of the shaft opposite the radial member 86 is sealed with respect to the housing member 72 by a seal assembly 90. The seal assembly 90 is fluid tight for preventing leakage of a coolant fluid which may be injected into the motor housing.

A pair of stators 91 and 92 is resiliently mounted within the housing of the motor. According to the present invention, the stator 91 is secured to a pair of resilient mounting rings 93 and 94 which, in turn, are secured to corresponding leaf members 96 and 97. The leaf members 96 and 97 are secured to the inner walls of the housing member 71 by bolts or other suitable means. Similarly, the stator 92 is secured to a pair of resilient mounting rings 98 and 99 which, in turn, are secured to resilient leaf members 100 and 101, respectively. The leaf members 100 and 101 are secured to the inner surface of the housing member 72.

A rotor 102 is positioned between the stators 91 and 92. The rotor 102 includes an extended portion 103 which is secured to a boss 104 of the shaft 87 by means of a rivet 106. The electrical leads connecting various windings of the rotor 102 pass through apertures within the shaft 87 and extend through the hollow portion of the shaft and are connected to various ones of the slip rings or segments 82 and 84 and the brush 79.

In operation, the motor 70 may be flooded with a light hydrocarbon or other nonconducting fluid to provide a low-drag working fluid for a hydrodynamic pole-face support system. In this manner, all of the heat generating components are immersed in this fluid which also acts as a heat exchange medium for the motor. Heat removal takes place in an external heat exchanger, not shown.

The motor of the present invention is particularly useful for underwater operation. Therefore, pressure balancing by a flexible-wall chamber is used between the flooding fluid of the motor and the water in which it is immersed to prevent fluid interchange problems at the shaft seal 90. Small amounts of water in the cooling fluid would not interfere with the motor operation directly, but since slip rings are being used to supply the rotor field coils and compensating windings with energizing currents, the possibility of corrosive slip ring damage exists in the case of long term contamination. However, because of the excellence of present day shaft seals, this problem is not considered severe.

The silicon controlled rectifiers 74 and 76 are shown extending from the motor housing and are coupled thermally to the coolant fluid therein. This configuration is suitable for operation in an ambient atmosphere at low pressures. However, for high pressures, where flooding of the entire motor region is desirable, the silicon controlled rectifiers would be totally enclosed within the motor housing to provide electrical insulation. For very high ambient pressures, such as are encountered in great ocean depths, it would be necessary to provide pressure protection for the silicon controlled rectifiers.

The silicon controlled rectifier mounting arrangement shown in FIG. 8 has several desirable features. One feature is that the heat generated by the conduction of the silicon controlled rectifiers is conducted directly to the motor frame and therefrom to the internal fluid. All armature connections are made directly to the silicon controlled rectifier mounting studs inside the frame, and the power supply connections are made directly to the external terminals of the silicon controlled rectifiers. Therefore, circuit connection lengths and weights are minimized and efficient cooling of the silicon controlled rectifiers is obtained.

The stators 91 and 92 are resiliently mounted to the interior of the housing of the motor. Therefore, this type of mounting will transmit torque to the housing but will allow the stators to move axially under the influence of magnetic or hydrodynamic forces. A finite gap is maintained between the rotor surfaces and the stators by a balance of these forces during operation. For example, during the static condition of the motor, not running, the rotor-to-stator clearance is approximately 0.010 inch. However, during operation of the motor the rotor and stator elements are pulled together by the magnetic field, thereby expelling fluid from the gap between the rotor and stators until the proper operating gap clearance is established.

It will be understood that induction rotor type motors can be constructed utilizing the novel concepts and teachings of the present invention. This is accomplished by continuing the rotor slotting with uniform spacing all the way around the rotor and filling the slots with solid conductors. These conductors are connected at their inner and outer ends to conducting bands with suitable finning to provide the necessary heat transfer area required. The number of rotor slots could be different than the stator by approximately one slot per pole region, and slot-skewing relative to the stator can be incorporated where noise reduction is desired.

Therefore, the disclosure of my invention sets forth a new and improved technique of motor construction. It will be understood that motors of given power parameters can be designed in several ways, and that optimization calculations may be necessary to show the best approach in the individual motor design. For example, the slot depths and the number of rotor and stator discs used may be varied depending upon the requirement of the motor so designed. Furthermore, shaft power can be increased by either increasing the slot and conductor depth or by increasing the number of discs at fixed diameters, flux densities, current densities and r.p.m. It should be noted that viscous drag losses increase with increasing number of discs so that in some motor designs it is desirable to employ a few discs as posible from a drag loss standpoint. At small slot depths, decreasing the number of discs would be the correct approach as the available torque and power increase substantially linearly as the slot depth increases. However, as slot depths become large, the increased slot current produces sizable azimuthal flux densities in the teeth-end regions. These flux densities add vectorially to the axial flux densiteis with their vector sum being limited by the saturation properties of the magnetic material employed in the teeth. Thus making the slot current, or slot depth substantially large, the azimuthal flux densities become comparable with the axial flux densities resulting in substantial decreases in the axial flux densities. This, in turn, results in a lower value of torque per unit current than was obtained at smaller slot depths. Therefore, as the slot depths of the pole pieces become excessively deep, the contributary tooth force and shaft torque will approach a limiting value governed by the saturation behavior of the magnetic material. The $I^2R$ losses in the conductor will increase linearly with slot depth, however, the conductor eddy current losses will increase even more rapidly. Other optimizing calculations for other configurations of the motor will become apparent to those skilled in the art when designing a motor for a particular function.

Accordingly, it will be understood that variations and modifications may be effected without departing from the spirit and scope of the novel concepts of this invention.

The embodiments of the invention in which an exclusive property or privilege is claimed are defined as follows:

1. A dynamoelectric machine comprising: a housing having first and second spaced apart end walls; a first disc-shaped stator having an aperture formed centrally therein; means for resiliently mounting said first disc-shaped stator to said first end wall; a second disc-shaped stator having an aperture formed centrally therein; means for resiliently mounting second disc-shaped stator to said second end wall; first magnetic pole means formed on said first stator; second magnetic pole means formed on said second stator; a shaft rotatably supported by said first and second end walls and passing through the apertures formed in said first and second disc-shaped stators; a disc-shaped rotor secured to said shaft and rotatable therewith, said rotor extending radially outwardly from said shaft to be positioned between said first and second stators and having the surfaces thereof substantially parallel with said first and second pole means; and means for creating a substantially uniform oblique magnetic field extending from said first and second magnetic pole means to the surfaces of said disc-shaped rotor.

2. A dynamoelectric machine according to claim 1 wherein said means for creating a substantially uniform oblique magnetic field comprises a plurality of current carrying conductors embedded in each of said first and second magnetic pole means.

3. A dynamoelectric machine according to claim 1 wherein said means for creating a substantially uniform oblique magnetic field comprises a plurality of spaced-apart slots formed in each of said first and second magnetic pole means, and current carrying conductors positioned within each of the slots.

4. A dynamoelectric machine according to claim 1 wherein said disc-shaped rotor includes a plurality of spaced-apart radially extending conductors embedded in each of the surfaces of said rotor, means for passing current in a predetermined direction through the conductors adjacent said first and second pole means; a plurality of spaced-apart radially extending compensating conductors embedded in each of said first and second pole means; and means for passing current through said compensating conductors in a direction opposite to that of the current passing through said conductors embedded in said rotor.

5. A dynamoelectric machine according to claim 1 wherein said disc-shaped rotor has a plurality of spaced-apart radially extending slots formed on each surface thereof; current carrying conductors positioned within each of said slots; means for causing current flow to pass through certain ones of said conductors adjacent respective first and second magnetic pole means; a plurality of spaced apart radially extending slots formed in each of said magnetic pole means; compensating conductors positioned within each of said slots formed in said magnetic pole means; and means for causing current flow to pass through said compensating windings in a direction opposite to the current flow passing through said certain ones of said conductors in said rotor.

6. A dynamoelectric machine according to claim 5 wherein the distance between said slots formed in said rotor and in said magnetic pole means is twice the distance of the width of the slots.

7. A dynamoelectric machine comprising: a housing having spaced-apart end walls; a disc-shaped stator having an aperture formed centrally therein; means for resiliently mounting said disc-shaped stator to one of said end walls; magnetic pole means formed on said first stator; a hollow shaft rotatably supported by said end walls and passing through the aperture formed in said disc-shaped stator; a disc-shaped rotor secured to said shaft and rotatable therewith, said rotor extending radially outwardly from said shaft and positioned to have a surface thereof substantially parallel with said magnetic pole means; means for creating a substantially uniform oblique magnetic field extending from said magnetic pole means to the adjacent surface of said disc-shaped rotor; a commutator including a first commutator portion secured to said housing and a second commutator portion secured to said shaft and rotatable therewith; and electric connections extending through said hollow shaft and connecting said second commutator portion and said disc-shaped rotor.

8. A dynamoelectric machine according to claim 7, comprising sealing means providing a fluid-tight housing for receiving a flow of fluid coolant; and electrical conduction control components carried on said housing and connected thereto for good thermal conductivity, said conduction control components including electrical connections disposed within said housing for connection to said first commutator portion.

9. A dynamoelectric machine according to claim 7, wherein said means for resiliently mounting said disc-shaped stator comprises a pair of concentrically disposed leaf members secured to said one end wall and a pair of concentrically disposed resilient rings secured between respective ones of said leaf members and said disc-shaped stator.

10. A dynamoelectric machine comprising: a housing; a first disc-shaped stator having an aperture formed centrally therein; means for resiliently mounting said first disc-shaped stator to said housing; a second disc-shaped stator having an aperture formed centrally therein; means for resiliently mounting said second disc-shaped stator to said housing; first magnetic pole means formed on said first stator; second magnetic pole means formed on said second stator; a shaft rotatably supported by said housing and passing through the apertures formed in said first and second disc-shaped stators; a disc-shaped rotor secured to said shaft and rotatable therewith; said rotor extending radially outwardly from said shaft to be positioned between said first and second stators and having the surfaces thereof substantially parallel with said first and second pole means; and means for creating a substantially uniform oblique magnetic field extending from said first and second magnetic pole means to the respective adjacent surfaces of said disc-shaped rotor.

References Cited

UNITED STATES PATENTS

| | | | |
|---|---|---|---|
| 1,266,388 | 5/1918 | Bergman | 310—224 |
| 2,721,282 | 10/1955 | Berg | 310—224 |
| 2,798,175 | 7/1957 | Sjökvist et al. | 301—224 |
| 3,072,814 | 1/1963 | Moressee et al. | 310—186 X |
| 3,159,761 | 12/1964 | Henry-Baudot | 310—186 |
| 3,223,867 | 12/1965 | Shapiro | 310—268 X |
| 3,428,840 | 2/1969 | Kober | 310—54 X |
| 3,445,691 | 5/1969 | Beyersdorf et al. | 310—57 X |

DONOVAN F. DUGGAN, Primary Examiner

U.S. Cl. X.R.

310—51, 57, 268